Oct. 7, 1958 A. HAMBURGEN ET AL 2,855,513

CLIPPING CIRCUIT WITH CLIPPING LEVEL AUTOMATICALLY SET BY AVERAGE INPUT LEVEL

Filed Nov. 30, 1955 2 Sheets-Sheet 1

INVENTORS
ARTHUR HAMBURGEN
EVON C. GREANIAS

BY Dewey J. Cunningham

ATTORNEY

*INVENTORS*
ARTHUR HAMBURGEN
EVON C. GREANIAS
*BY* Dewey J. Cunningham
ATTORNEY

United States Patent Office 2,855,513

Patented Oct. 7, 1958

2,855,513

CLIPPING CIRCUIT WITH CLIPPING LEVEL AUTOMATICALLY SET BY AVERAGE INPUT LEVEL

Arthur Hamburgen, Endicott, and Evon C. Greanias, Vestal, N. Y., assignors to International Business Machines Corporation, New York, N. Y., a corporation of New York Application November 30, 1955, Serial No. 550,145

16 Claims. (Cl. 250—27)

The present invention relates to signal translating apparatus, particularly such apparatus as is used in handling signals obtained from devices which are scanning graphic data.

While there are a number of methods used in scanning graphic data on a record medium, one of the methods which appears to be the fastest includes the use of a light sensitive device such as a photomultiplier. In such a method, the graphic data, which may be characters in the form of code marks or alpha-numeric information, is scanned by means of a suitable scanning apparatus. Such apparatus may be in the form of a mechanical scanner or it may be a cathode ray apparatus such as a "flying spot" scanner or an iconoscope. In any event, some form of light sensitive means must be used to detect gradations of light which result from scanning the character. The output signals from the light sensitive means normally have an instantaneous amplitude which is a function of the amount of light viewed thereby.

A serious limitation in the above type of apparatus is the relatively poor signal which is frequently encountered with low contrast copy. That is, the characters may be anywhere from a dark color which contrasts greatly with the background to a very light color which tends to merge with the background. At other times both the background and characters may vary in density at the same time. In many cases, contrast between the character and its background may be such as to permit an easy distinction to the human eye, but to the light sensitive device, the distinction may be only slight. In order to match the ability of the human eye to detect subtle contrasts, a scanning system such as that under discussion must be equipped to compensate for variations in the general density level of the data. It must, in effect, be able to indicate that character lines are "black" and the background is "white" for overlapping ranges of viewed light.

A common technique for discriminating black and white signals, i. e., those from the character and those from the background, is to establish a discriminating or clipping voltage level which must be exceeded by the analog signal from the light sensitive device when an area of the character is scanned. Unfortunately, a single discriminating level is at most a compromise, and may result in passing too much undesirable data or not enough of the desirable data.

The present invention has as one of its objects the provision of an improved signal translating apparatus for signals obtained from light sensitive devices used in scanning graphic data.

Another object of the invention is to furnish an improved translating apparatus for handling signals obtained in scanning graphic data such as characters, said circuit producing reliable signals from those signals produced in scanning characters having subtle contrast with the background upon which they are positioned.

Still another object of the invention is to furnish a circuit as described above in which a dynamic discriminating or clipping level is established for the signals obtained by scanning characters.

A further object is to provide a circuit for receiving video signals and applying variable amplitude discriminating levels thereto, which levels vary at different rates as a function of said video signal variations.

Still further, it is an object of this invention to furnish an improved circuit for receiving video signals and applying variable amplitude discriminating levels thereto, the means for applying said variable amplitude discriminating levels including means which is controlled in part by the video signals and in part by the signals which exceed the discriminating level.

Other objects of the invention will be pointed out in the following description and claims and illustrated in the accompanying drawings, which disclose, by way of examples, the principle of the invention and the best mode, which has been contemplated, of applying that principle.

In the drawings.

Similar reference characters represent similar parts throughout the several views.

In general, the present invention provides a plurality of selective conducting paths between a video signal input terminal and an integrating circuit. If the voltage at the integrating circuit is lower than the video signal, then the integrating circuit receives the video signal through one of two paths, the path used being dependent on whether the past history indicates that a portion of the character is being scanned. If the voltage at the integrating circuit is higher than the video signal, then its potential begins to decrease toward the video signal level through one of two paths, the path used being dependent on whether the past history indicates that a portion of the character is being scanned. The output potential from the integrating circuit is supplied through a D. C. output circuit to set the amplitude discriminating level in a data channel. The D. C. output circuit is designed such that at a particular input potential, the output will be equal thereto. If the input happens to be above or below said particular input potential, then the output will be respectively less or greater than the input. The video signal is also supplied to the data channel and if it rises above the discriminating level, an output potential is produced. This indicates to the recognition circuit that a portion of the character is being sensed by the scanning means. The output signals from the data channel are used by a gate generator to furnish gating pulses to each of the aforementioned four selective conducting paths. The over-all result from the above circuit is to afford dynamic control of the discriminating level of a data channel so that weak video data can be picked up. Yet, the discriminating level is raised for good data to keep from picking up background noise.

Figure 1:
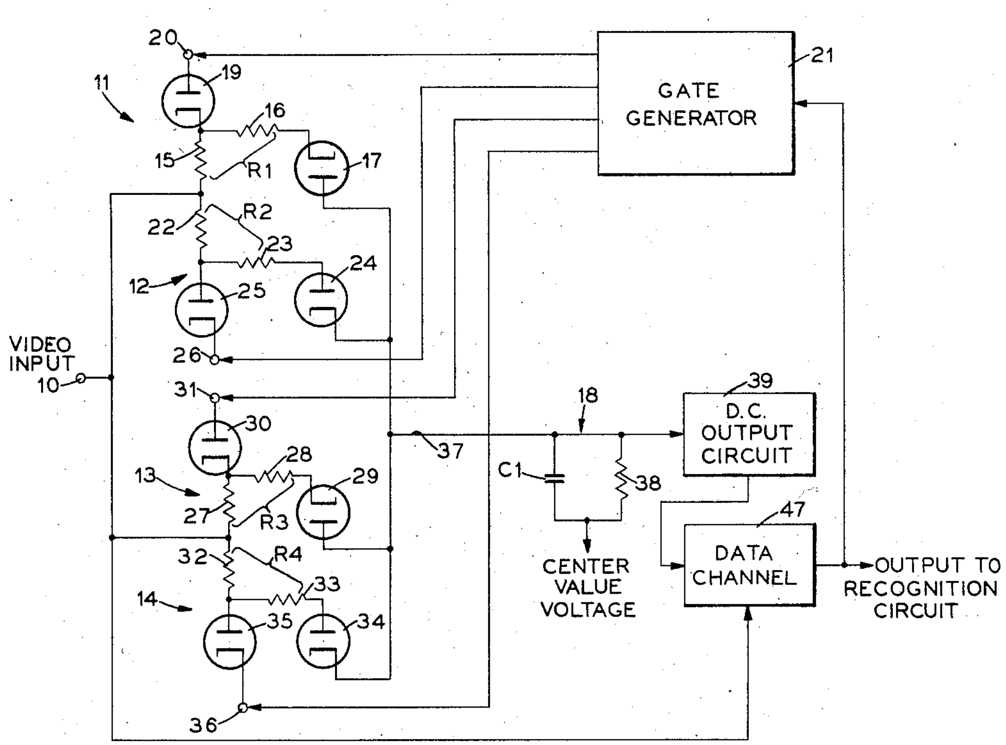
Fig. 1 is a schematic diagram of the present invention with certain components thereof being illustrated in block form.

In greater detail, reference is made to Fig. 1 which shows an over-all schematic diagram of the present invention. The video input terminal 10 is connected to each of four gates which are illustrated generally by reference numerals 11, 12, 13 and 14. Gate 11 includes a resistance R1, which is composed of series resistors 15 and 16, and a vacuum diode 17, the cathode of said diode being connected to one end of resistor 16 and the plate thereof being connected to an integrating circuit illustrated generally by reference numeral 18. The junction between resistors 15 and 16 is connected to the cathode of a vacuum diode 19 whose plate is connected to a terminal 20. This terminal is adapted to receive a gating pulse from gate generator 21.

Gate 12 includes a resistance R2, which is composed of resistors 22 and 23, and a vacuum diode 24, the plate of said diode being connected to one end of resistor 23 and the cathode thereof being connected to integrating circuit 18. The junction between resistors 22 and 23 is connected to the plate of a vacuum diode 25 whose cathode is connected to a terminal 26. This terminal is adapted to receive a gating pulse from gate generator 21.

Gate 13 includes a resistance R3, which is composed of resistors 27 and 28, and a vacuum diode 29, the cathode of said diode being connected to one end of resistor 28 and the plate thereof being connected to integrating circuit 18. The junction between resistors 27 and 28 is connected to the cathode of vacuum diode 30 whose plate is connected to a terminal 31. This terminal is adapted to receive a gating pulse from gate generator 21.

Gate 14 includes a resistance R4, which is composed of resistors 32 and 33, and a vacuum diode 34, the plate of said diode being connected to one end of resistor 33 and the cathode thereof being connected to integrating circuit 18. The junction between resistors 32 and 33 is connected to the plate of a vacuum diode 35 whose cathode is connected to a terminal 36. This terminal is adapted to receive a gating pulse from gate generator 21.

Figure 2:
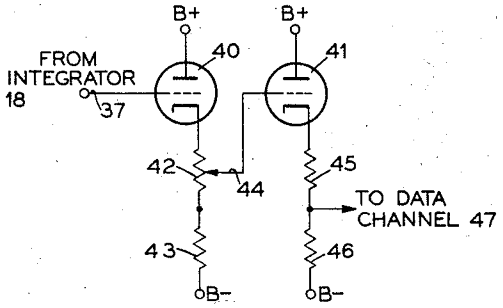
Fig. 2 is a schematic diagram of the D. C. output circuit shown in block form in Fig. 1.
Figure 3:
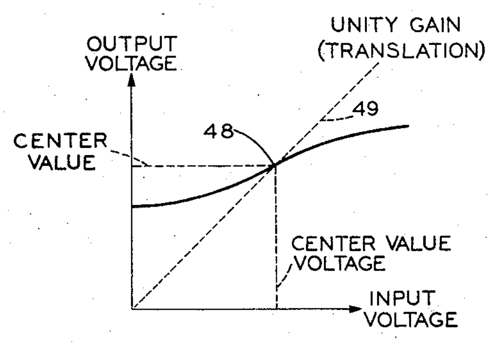
Fig. 3 shows a plot of the output voltage against the input voltage for the circuit shown in Fig. 2.

Integrating circuit 18 comprises a capacitor C1 which is connected between the common line 37 from gates 11 through 14 and a center value reference potential which, by way of example, may be +50 v. D. C. A resistor 38 is connected in shunt with capacitor C1. The potential on line 37 is connected to a D. C. output circuit 39 the details of which are shown in Fig. 2. This output circuit has the characteristic that if the input thereto is at a specific potential, the output therefrom will be equal to said specific potential. However, if the input to circuit 39 is above or below the afore-mentioned specific potential, then the output will be respectively less or greater than the input. Referring to Fig. 2 there is shown a pair of triodes 40 and 41 each of which is connected as a cathode follower. The input to the control grid of triode 40 is from integrator 18 over line 37. The plate of triode 40 is connected to a positive source of reference potential herein illustrated as +150 v. D. C. and the cathode is connected through potentiometer 42 and resistor 43 to a negative source of D. C. potential herein illustrated as −100 v. D. C. A slider 44 on potentiometer 42 is connected to the control grid of triode 41. The plate of said triode being connected to a source of positive D. C. potential, herein illustrated as +150 v. D. C., and the cathode being connected through resistors 45 and 46 to a negative source of D. C. potential, herein illustrated as −100 v. D. C. The output is taken from between resistors 45 and 46 and is adapted to be supplied to a data channel 47. The gain characteristic of the circuit shown in Fig. 2 is illustrated in Fig. 3. This figure shows the input voltage plotted along the abscissa and the output voltage plotted along the ordinate. The afore-mentioned specific potential which provides an output equal thereto, i. e., unity translation, is illustrated in Fig. 3 as a center value potential. It will be seen that the curve 48 crosses the unity transformation plot 49 at the center value input and output potential. It is apparent from curve 48 that if the input voltage rises above the center value potential the output is less than the input. If the input voltage goes below the center value potential, then the circuit of Fig. 2 will produce an output greater than the input.

Figure 4:
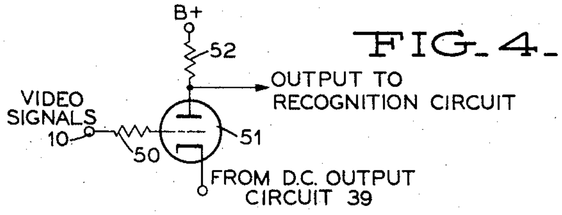
Fig. 4 is a schematic diagram of an amplitude discriminating or clipping circuit shown in block form in Fig. 1.

Data channel 47 may be in the form of an amplitude discriminating circuit or a clipping circuit whose level of amplitude discrimination is determined by the output potential from the output circuit 39. The data channel is also arranged to receive the video input signal from terminal 10. By way of example, a data channel circuit which might be used is illustrated in Fig. 4. Video signals from terminal 10 are fed through a current limiting resistor 50 to the control grid of a triode 51. The plate of the last-named triode is connected through resistor 52 to a positive source of D. C. potential, herein illustrated as +150 v. D. C., and the cathode is connected to receive the afore-mentioned output from circuit 39. The plate of triode 51 serves as the cutpoint point and is adapted to supply output pulses of variable width but of substantially uniform amplitude to the recognition circuit. The plate is also connected to gate generator 21 and serves as the input thereto, from which input gating pulses are supplied to terminals 20, 26, 31 and 36 of gates 11, 12, 13 and 14, respectively.

Figure 5:
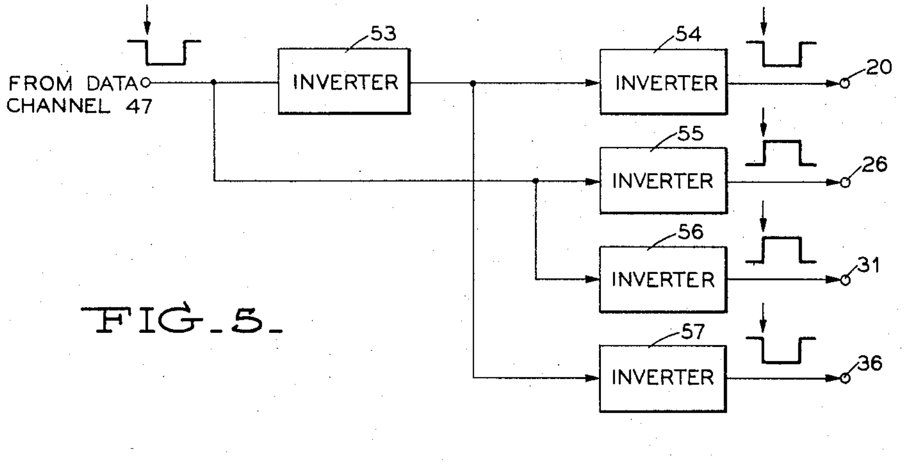
Fig. 5 is a schematic block diagram of the gate generator illustrated by a single block in Fig. 1.

Gate generator 21 may take a number of different forms, one of which is illustrated in block diagram fashion in Fig. 5. This example comprises a plurality of conventional inverters which are combined in a manner to produce the proper amplitude output signals from applied input signals. A relatively negative output signal from the data channel 47 indicates that a portion of a character is being scanned whereas a relatively positive output signal indicates that the background is being scanned. Terminal 20 is to have a gating pulse which is of the same phase or polarity as the output from the data channel. Thus, inverting amplifiers 53 and 54 are used to obtain sufficient drive to produce gating signals at terminal 20. The gating signal at terminal 26 is to be of a phase or polarity opposite to that of the signal from data channel 47. Thus, inverter 55 is connected between the output of the data channel and terminal 26 so that when the output from the data channel goes relatively negative, terminal 26 will go relatively positive. Terminal 31 is to have substantially the same gating signals applied thereto as were supplied to terminal 26. Thus, inverter 56 is provided between the data channel output and terminal 31. The output from inverter 53 is connected through an inverter 57 to terminal 36, thereby producing the same phase or polarity signals thereat as are supplied from data channel 47.

Sample signals are shown at various points in Fig. 5 to show the relation between the input and the many outputs. An arrow is used to establish a time coincidence of signals. The design of the inverters utilized in Fig. 5 is such that the signals at terminals 20, 26, 31 and 36 have a maximum amplitude which is slightly higher than the maximum amplitude signal which may be expected at the video input terminal 10 and a minimum amplitude which is slightly lower than the minimum amplitude signal which may be expected at said terminal 10. For example, if the input signals at terminal 10 have a range between one and ninety volts, then the relatively positive potentials at terminals 20, 26, 31 and 36 should be slightly above ninety volts and the relatively negative potentials at these terminals should be slightly below one volt. The degree to which the gate signals are above or below the range of video input signals is not critical.

The operation of the present invention will now be described in detail. Video input signals received at terminal 10 are representative of the amount of light viewed by a light sensitive device scanning a character. More and more relatively positive video signals indicate less and less light which is viewed by said light sensitive device. Thus, it will be apparent that relatively high amplitude signals indicate that a portion of a character is being scanned and relatively low amplitude signals indicate that the background around the character is being scanned. Due to varying density of ink on the background as well as the characters themselves, it is not unusual for certain background signals to have a higher amplitude than certain of the character signals. Thus, if significance is to be given to the video signals, it is necessary to apply a dynamic amplitude discriminating level to the video signals so as to distinguish character signals from background signals. This invention accomplishes this by connecting the video input terminal 10 to an integrating circuit 18 by means of alternate conducting paths in the form of gates 11, 12, 13 and 14.

If the video signal amplitude is above the potential at the integrator, then one of two paths is used for the video signal to be applied to the integrator. If the data channel output indicates that a portion of a character is being sensed, then gate 12 serves as the conducting path and $C_1$ in integrator 18 is charged at a rate determined by the time constant $R_2C_1$. The value of resistor 38 is chosen such that it is much larger than $R_1$, $R_2$, $R_3$ or $R_4$, and therefore does not have an appreciable effect on the time constant. If the data channel output indicates that a portion of a character is not being sensed, then gate 14 serves as the conducting path and $C_1$ in integrator 18 is charged at a rate determined by the time constant $R_4C_1$. In this particular implementation, the value of $R_2$ is chosen such that a long time constant is furnished to raise the charge on $C_1$ slowly during strong character signals. The value of $R_4$ is chosen such that a short time constant is provided to raise the charge on $C_1$ rapidly when noise pulses occur during background signals.

If the video signal amplitude at terminal 10 is below the potential at the integrator, then one of two paths is used to lower the charge on $C_1$ in order to let its potential drop toward the video signal amplitude. If the data channel output indicates that a portion of a charatcer is being sensed, then gate 11 serves as the conducting path and $C_1$ in integrator 18 is discharged at a rate determined by the time constant $R_1C_1$. If the data channel indicates that a portion of the character is not being sensed, then gate 13 serves as the conducting path and $C_1$ is discharged at a rate determined by $R_3C_1$. The value of $R_1$ is chosen such that a short time constant is furnished to discharge $C_1$ rapidly when character signals become weaker. The value of $R_3$ is chosen such that a long time constant is furnished to discharge $C_1$ slowly when neither character signal nor noise is present.

The potential on the side of $C_1$ connected to line 37 is fed as the input to D. C. output circut 39. The potential out of the D. C. output circuit 39 is fed to data channel 47 as the discriminating or clipping level therefor.

The video input signals from terminal 10 are also applied to the data channel. It is thus seen that unless the video signals exceed the discriminating level in the data channel no output is provided therefrom. If the video signals do exceed the discriminating level, then a uniform amplitude output signal is furnished. The duration of each output signal is equal to the time during which the discriminating level is exceeded.

As previously discussed, the output signals from the data channel are used to generate gating signals in generator 21 for controlling gates 11 through 14.

Figure 6:
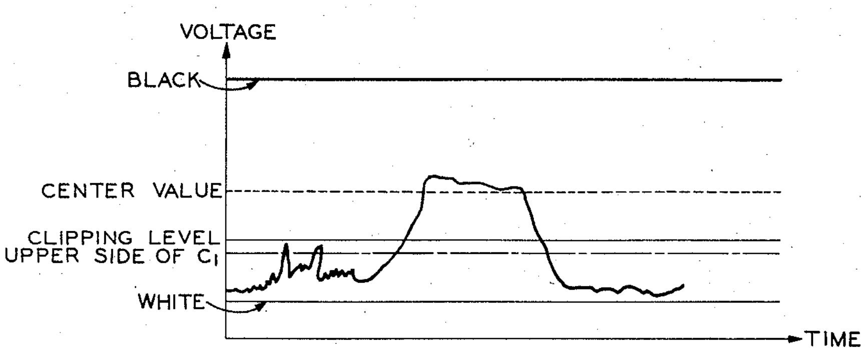
Figs. 6 and 7 show sample video signal waveforms and the effect thereof on the circuit shown in Fig. 1.
Figure 7:
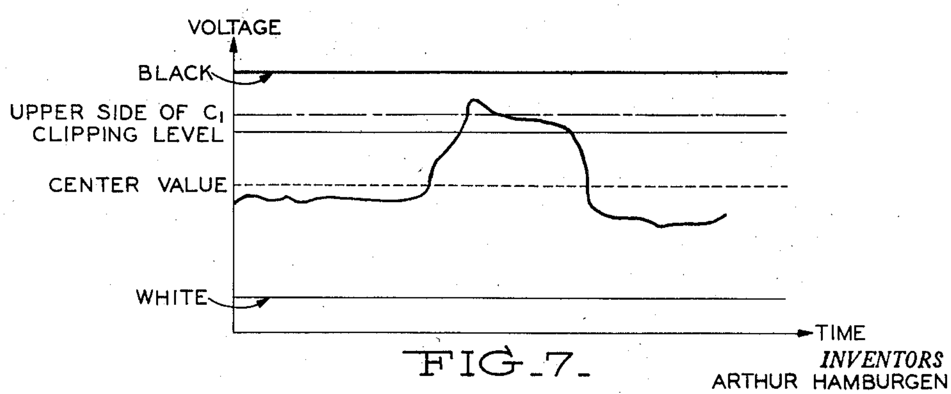

The operation of this invention is exemplified in two cases illustrated in Figs. 6 and 7. The top and bottom lines in each case indicate black and white signal levels, respectively. It will be appreciated that seldom will the data viewed by the light sensitive device allow the device to produce signals at these levels. Instead, the video signals will range between these two levels. No attempt has been made in either of Figs. 6 or 7 to show the potential variations on the upper side of $C_1$ or the clipping level potential variations under the given signal conditions. It will be appreciated, however, that actually these potentials do change in a manner which will be apparent from the following description.

In the first case, shown in Fig. 6, the video signal indicates that the light sensitive device has been viewing data background which is quite light. As long as the video signal stays below the voltage on the upper side of $C_1$, i. e., that opposite to the side connected to the center value potential, gate 13 serves as the conductive path and tends to slowly lower the potential on said upper plate and thereby the clipping level is applied to the data channel. As soon as the video input signal exceeds the potential on the upper side of $C_1$, gate 14 conducts to begin raising the upper side of $C_1$, and thereby the clipping level, rapidly. Note that the noise signals in the early part of the video signal rise above the potential on the upper side of $C_1$. Thus, by rapidly raising the clipping level in response to such signals, there is a greater tendency to discriminate against noise signals.

After the noise signals occur, the video signal begins a marked rise above the potential on the upper side of $C_1$ such that gate 14 conducts to rapidly charge $C_1$. This is of short duration, however, since thereafter the video signal passes the clipping level so that now gate 12 is the conductive path and $C_1$ is charged at a slower rate. In other words, it is now known that a portion of a character is being scanned and the clipping level is only slowly raised. This action continues even though the video signal rises above the center value potential. In such a case, however, once the video signal goes above the center value potential the potential from the D. C. output circuit 39 is less than the input thereto. It will be seen that if this occurred for a sufficient time, the clipping level would tend to go below the potential on the upper side of $C_1$, as will be more apparent from the second case which is shown in Fig. 7.

Referring to Fig. 7, the video signal begins at a point just below the center value potential. Since the clipping level is considerably above the center value potential, it is apparent that the background of the data being scanned is much darker than was the case in Fig. 6. Since the clipping level is above the center value potential, the potential on the upper side of $C_1$ is above the clipping level. With the video signal below the clipping level, gate 13 serves as the conductive path and the upper side of $C_1$, as well as the clipping level, slowly drop. As the video signal goes above the clipping level, and before it reaches the level of the upper side of $C_1$, gate 11 serves as the conductive path to lower both the clipping level and the upper side of $C_1$ rapidly. In other words, there has been an indication that a portion of a character is being sensed and the clipping level is lowered to better pick up the character signal. As soon as the video signal exceeds the potential on the upper side of $C_1$, gate 12 serves as the conductive path and the charge of $C_1$ is slower than before. Thus, there is an indication that a strong character signal is present and the clipping level is slowly raised.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A signal translating apparatus for video signals produced by light sensitive means scanning graphic data, a discriminator circuit connected to receive said video signals for determining in response to a control signal which of said video signals will produce output signals from said discriminator circuit, and means connected to receive said video signals under the direction of said output signals for generating said control signal, the last-named means including a plurality of conductive paths and an integrating circuit, said conductive paths being gated by said output signals for connecting said video signals to said integrating circuit.

2. A signal translating apparatus for video signals produced by light sensitive means scanning graphic data, a discriminator circuit connected to receive said video signals for determining in response to a control signal which of said video signals will produce output signals from said discriminator circuit, and means connected to receive said video signals under the direction of said output signals for generating said control signal, the last-named means including a capacitor having one side connected to a reference potential, a plurality of conductive paths for connecting said video signals to the other side of said capacitor, said conductive paths being gated by said output signals, and an output circuit for coupling said other side of said capacitor and said discriminator circuit.

3. A signal translating apparatus for video signals produced by light sensitive means scanning graphic data, a discriminator circuit connected to receive said video signals for determining in response to a control signal which of said video signals will produce output signals from said discriminator circuit, means for generating a control signal which determines said discriminating level, the last-named means comprising a capacitor having one side connected to a reference potential, a plurality of separate conductive paths coupling said video signals to the other side of said capacitor, each path including resistive means which form a time constant with said capacitor, means responsive to said output signals for selecting the conductive path which is to serve as the coupling between said video signals and said other side of said capacitor, and means for coupling said other side of said capacitor to said discriminator circuit so as to provide said control signal.

4. A signal translating apparatus comprising a discriminator circuit connected to receive input signals and to produce output signals therefrom for those input signals which are on one side of a discriminating level, means for generating a control signal which determines said discriminating level, the last-named means comprising a capacitor having one side connected to a reference potential and the other side coupled to said discriminator circuit, the potential on said other side of said capacitor serving as said control signal, a plurality of conductive paths for coupling said input signals to said other side of said capacitor, and means responsive to said output signals for selecting the path which is to be immediately operative to form said coupling between said input signals and said other side of said capacitor.

5. A signal translating apparatus comprising a discriminator circuit connected to receive input signals and to produce output signals therefrom for those input signals which are on one side of a discriminating level, means for generating a control signal which determines said discriminating level, the last-named means comprising an integrator whose output is used as said control signal, the input to said integrator comprising a plurality of paths which couple said input signal to said integrator, each of said paths being selectively conductive as a function of said output signals and the relationship between the amplitude of said input signal and said control signal.

6. A signal translating apparatus comprising a discriminator circuit connected to receive input signals and to produce output signals therefrom for those input signals which are on one side of a discriminating level, means for generating a control signal which determines said discriminating level, the last-named means comprising an integrator whose output is used as said control signal, the input to said integrator comprising a plurality of gates which couple said input signal to said integrator, each of said gates being selectively conductive as a function of said output signals and the relationship between the instantaneous amplitudes of said input signals and said control signal.

7. A signal translating apparatus comprising a voltage discriminator circuit connected to receive input signals and to produce output signals therefrom for those input signals which are on one side of a discriminating voltage level, means for generating a control signal which determines said discriminating voltage level, the last-named means comprising a capacitor having one side connected to a reference potential and the other side connected to an input circuit and an output circuit, said input circuit being adapted to receive said input signals and said output circuit being connected to said discriminator circuit, and means for selectively controlling the impedance of said input circuit in response to said output signals.

8. A signal translating apparatus comprising a discriminator circuit connected to receive input signals and to produce output signals therefrom for those input signals which are on one side of a discriminating level, means for generating a control signal which determines said discriminating level, the last-named means comprising a capacitor having one side connected to a reference potential and the other side connected to an input circuit and an output circuit, said input circuit being adapted to receive said input signals and said output circuit being connected to said discriminator circuit, said input circuit comprising a plurality of gates which are selectively conductive, the selection of the gate to be conductive being under the control of said output signal and the amplitude relationship between said input signals and the potential on said other side of said capacitor.

9. A signal translating apparatus for video signals comprising a discriminator circuit connected to receive said video signals and to produce output signals from those video signals which exceed an amplitude discriminating level in said discriminator circuit, and means for determining said amplitude discriminating level including a capacitor having one side connected to a reference potential and the other side connected to an input circuit and an output circuit, said input circuit serving as the coupling between said video signals and said other side of said capacitor and said output circuit serving as the coupling between said other side of said capacitor and said discriminator circuit, said output circuit including means which produces an output potential which is of a lesser magnitude than the input potential supplied thereto when said input potential exceeds a predetermined potential and which produces an output potential which is of a greater magnitude than the input potential supplied thereto when said input potential does not exceed said predetermined potential.

10. A signal translating apparatus for video signals comprising a voltage discriminator circuit connected to receive said video signals and to produce output signals from those video signals which exceed an amplitude discriminating voltage level in said discriminator circuit, and means for determining said amplitude discriminating voltage level including a capacitor having one side connected to a reference potential and the other side connected to an input circuit and an output circuit, said input circuit serving as the coupling between said video signals and said other side of said capacitor and said output circuit serving as the coupling between said other side of said capacitor and said discriminator circuit, said output circuit including means which produces an output potential which varies in a non-linear fashion with respect to the input potential supplied thereto, and means for selectively controlling the impedance of said input circuit in response to said output signals.

11. A signal translating apparatus for video signals comprising a discriminator circuit connected to receive said video signals and to produce output signals from those video signals which exceed an amplitude discriminating level in said discriminator circuit, and means for determining said amplitude discriminating level including a capacitor having one side connected to a reference potential and the other side connected to an input circuit and an output circuit, said input circuit serving as the coupling between said video signals and said other side of said capacitor and said output circuit serving as the coupling between said other side of said capacitor and said discriminator circuit, said input circuit comprising a plurality of gates connected to be controlled by said output signals from said discriminator circuit.

12. A signal translating apparatus for video signals comprising a discriminator circuit connected to receive said video signals and to produce output signals from those video signals which exceed an amplitude discriminating level in said discriminator circuit, and means for determining said amplitude discriminating level including a capacitor having one side connected to a reference potential and the other side connected to an input circuit and an output circuit, said input circuit serving as the coupling between said video signals and said other side of said capacitor and said output circuit serving as the coupling between said other side of said capacitor and said discriminator circuit, said input circuit comprising a plurality of gates connected to be controlled by said output signals from said discriminator circuit, each of said gates including resistance means which determine in conjunction with said capacitor the time constant for the change in potential on said other side of said capacitor.

13. A signal translating apparatus for video signals comprising a discriminator circuit connected to receive said video signals and to produce output signals from those video signals which exceed an amplitude discriminating level in said discriminator circuit, and means for determining said amplitude discriminating level including a capacitor having one side connected to a reference potential and the other side connected to an input circuit and an output circuit, said input circuit serving as the coupling between said video signals and said other side of said capacitor and said output circuit serving as the coupling between said other side of said capacitor and said discriminator circuit, said input circuit comprising a plurality of gates connected to be controlled by said output signals from said discriminator circuit, each of said gates comprising a unidirectional conducting device and a resistance so that certain of said gates will allow the charge on said capacitor to increase when said video signals are higher in magnitude than the potential on said other side of the capacitor and to decrease when said video signals are lower in magnitude than the potential on said other side.

14. A signal translating apparatus for video signals comprising a discriminator circuit connected to receive said video signals and to produce output signals from those video signals which exceed an amplitude discriminating level in said discriminator circuit, and means for determining said amplitude discriminating level including a capacitor having one side connected to a reference potential and the other side connected to an input circuit and an output circuit, said input circuit comprising a plurality of gates, certain ones of said gates being conditioned to be conductive by the presence of an output signal and certain others of said gates being conditioned to be conductive by the absence of an output signal, and a unidirectional conducting device in each of said gates for determining which of said conditioned gates will be conductive.

15. A signal translating apparatus for video signals comprising a discriminator circuit connected to receive said video signals and to produce output signals from those video signals which exceed an amplitude discriminating level in said discriminator circuit, and means for determining said amplitude discriminating level including a capacitor having one side connected to a reference potential and the other side connected to an input circuit and an output circuit, said input circuit including a plurality of pairs of gates connected to said discriminator circuit, a first pair of said gates being conditioned to be conductive by the presence of an output signal and a second pair being conditioned to be conductive by the absence of an output signal, each gate of said first and second pairs of gates including a resistance means and a unidirectional device, the unidirectional devices in each pair being oppositely oriented so that said capacitor is charged through one gate of a conditioned pair of gates when the amplitude of said video signals exceeds the potential on said other side of the capacitor and said capacitor is discharged through another gate of a conditioned pair of gates when the amplitude of said video signals does not exceed the potential on said other side of the capacitor.

16. A signal translating apparatus for video signals comprising a discriminator circuit connected to receive said video signals and to produce output signals from those video signals which exceed an amplitude discriminating level in said discriminator circuit, and means for determining said amplitude discriminatng level including a capacitor having one side connected to a reference potential and the other side connected to an input circuit and an output circuit, said input circuit including a plurality of pairs of gates connected to said discriminator circuit, a first pair of said gates being conditioned to be conductive by the presence of an output signal and a second pair being conditioned to be conductive by the absence of an output signal, each gate of said first and second pairs of gates including a resistance means and a unidirectional device, the resistance means in each gate of at least one of said first and second pairs of gates being of different resistive values, the unidirectional devices in each pair being oppositely oriented so that said capacitor is charged through one gate of a conditioned pair of gates and when the amplitude of said video signals exceeds the potential on said other side of the capacitor and said capacitor is discharged through another gate of a conditioned pair of gates when the amplitude of said video signals does not exceed the potential on said other side of the capacitor.

References Cited in the file of this patent

UNITED STATES PATENTS

| | | |
|---|---|---|
| 2,493,648 | Watton et al. | Jan. 3, 1950 |
| 2,538,027 | Mozley et al. | Jan. 16, 1951 |
| 2,560,600 | Schafer | July 17, 1951 |